(12) United States Patent
Liao

(10) Patent No.: US 9,051,147 B2
(45) Date of Patent: Jun. 9, 2015

(54) CLAMP MECHANISM AND RELATED PRINTER

(75) Inventor: Ku-Feng Liao, Taichung (TW)

(73) Assignee: HiTi Digital, Inc., Xindian Dist., New Taipei (TW)

( * ) Notice: Subject to any disclaimer, the term of this patent is extended or adjusted under 35 U.S.C. 154(b) by 117 days.

(21) Appl. No.: 13/473,616

(22) Filed: May 17, 2012

(65) Prior Publication Data

US 2013/0180421 A1    Jul. 18, 2013

(30) Foreign Application Priority Data

Jan. 18, 2012    (TW) .............................. 101101911 A

(51) Int. Cl.
| B41F 21/00 | (2006.01) |
| B41F 27/12 | (2006.01) |
| B65H 20/02 | (2006.01) |
| B65H 19/29 | (2006.01) |
| B41F 1/28 | (2006.01) |

(52) U.S. Cl.
CPC . B65H 20/02 (2013.01); B41F 1/28 (2013.01); B65H 19/29 (2013.01); *B65H 2301/522* (2013.01); *B65H 2403/942* (2013.01); *B65H 2801/12* (2013.01)

(58) Field of Classification Search
CPC ............ B41F 1/28; B41F 27/06; B41F 27/12; B41F 30/04; H04N 1/08; H04N 1/0839; H04N 1/0843; H04N 1/0813; H01N 1/0804; B65H 5/12; B65H 5/14
USPC ........... 101/409, 415.1, 477, 382, 383, 389.1, 101/408; 271/82, 277, 275, 276
See application file for complete search history.

(56) References Cited

U.S. PATENT DOCUMENTS

| 3,896,729 A | * | 7/1975 | Moyer ....................... 101/415.1 |
| 4,033,575 A | * | 7/1977 | Fujimoto ..................... 271/3.15 |
| 4,660,825 A | * | 4/1987 | Umezawa ..................... 271/276 |
| 5,231,927 A | * | 8/1993 | Pfisterer et al. ............... 101/409 |
| 5,324,023 A | * | 6/1994 | Fedorjaka ..................... 271/277 |
| 5,362,043 A | * | 11/1994 | Grellman ..................... 271/277 |
| 6,260,482 B1 | * | 7/2001 | Halup et al. .................. 101/477 |
| 6,412,413 B1 | * | 7/2002 | Tice et al. ..................... 101/409 |
| 6,994,027 B1 | * | 2/2006 | Diramio ........................ 101/409 |
| 7,644,658 B2 | * | 1/2010 | Nagler et al. .............. 101/415.1 |
| 8,397,636 B2 | * | 3/2013 | Frentzel et al. ............ 101/415.1 |

FOREIGN PATENT DOCUMENTS

| CN | 1498835 A | 5/2004 |
| CN | 1721196 A | 1/2006 |
| CN | 1939749 A | 4/2007 |
| JP | 6238988 | 8/1994 |
| TW | 416914 | 1/2001 |
| TW | M288591 | 3/2006 |
| TW | 200700246 | 1/2007 |
| TW | M315163 | 7/2007 |

* cited by examiner

*Primary Examiner* — Blake A Tankersley
*Assistant Examiner* — Marissa Ferguson Samreth
(74) *Attorney, Agent, or Firm* — Winston Hsu; Scott Margo

(57) ABSTRACT

A clamp mechanism for fixing a printing medium is disclosed in the present invention. The clamp mechanism includes a base, a drum pivotably disposed on the base, a frame disposed on the drum, a clamping component movably disposed on the frame for clamping an end of the printing medium with the drum, and a resilient component disposed between the frame and the clamping component for pressing the clamping component on a surface of the drum so as to clamp the end of the printing medium.

18 Claims, 7 Drawing Sheets

CLAMP MECHANISM AND RELATED PRINTER

BACKGROUND OF THE INVENTION

1. Field of the Invention

The present invention relates to a clamp mechanism and a related printer, and more particularly, to a clamp mechanism and a related printer that do not hurt the printing medium.

2. Description of the Prior Art

Please refer to FIG. 1. FIG. 1 is a diagram of a conveying mechanism 10 in the prior art. The conveying mechanism 10 includes a print head 12, a platen roller 14, a pinch roll 16 and a capstan roller 18. The printing medium moves from the print head 12 and the platen roller 14 to the pinch roll 16 and the capstan roller 18. The print head 12 presses the platen roller 14, which means the platen roller 14 clamps the printing medium with the print head 12. The pinch roller 16 is rotated by a driving motor, and conveys the printing medium according to structure of the capstan roller 18, so that predetermined dye on a ribbon can be transferred to the printing medium for forming the pattern by the print head 12. A plurality of thorns 181 is disposed on a surface of the capstan roller 18. The thorns 181 fix the printing medium to prevent separation. A plurality of apertures is formed on the printing medium by the thorns 181 along a conveying path of the printing medium. A conventional printer utilizes Matt technology to conceal the apertures on the printing medium, or obscures the pattern over the apertures directly. However, drawbacks of the apertures are detected by eyes and hand touch easily, so the conventional printer can not utilized to print the high quality pattern. Thus design of a printer with preferable printing quality is an important issue in the mechanical industry.

SUMMARY OF THE INVENTION

The present invention provides a clamp mechanism and a related printer that do not hurt the printing medium for solving above drawbacks.

According to the claimed invention, a clamp mechanism includes a base, a drum pivotably disposed on the base, a frame disposed on the drum, a clamping component movably disposed on the frame for clamping an end of a printing medium with the drum, and a resilient component disposed between the frame and the clamping component for pressing the clamping component on a surface of the drum to clamp the end of the printing medium.

According to the claimed invention, a cushion is disposed on the surface of the drum.

According to the claimed invention, a thorn is disposed on a surface of the clamping component adjacent to the drum.

According to the claimed invention, the clamp mechanism further includes a sensor disposed on the frame for generating a control signal when the printing medium moves through the drum and the clamping component, so as to drive the clamping component to clamp the end of the printing medium with the drum.

According to the claimed invention, the sensor is an optical interrupter.

According to the claimed invention, the clamp mechanism further includes a driving mechanism disposed on the base and connected to the drum for rotating the drum, so as to move the clamping component to an initial position and to an actuating position.

According to the claimed invention, the clamp mechanism further includes a linkage disposed on the base for separating the clamping component from the surface of the drum.

According to the claimed invention, the clamp mechanism further includes a cam disposed on the base for separating the linkage from the clamping component.

According to the claimed invention, a printer includes a supporter for supporting a printing medium, a clamp mechanism and a convey mechanism. The clamp mechanism includes a base, a drum pivotably disposed on the base, a frame disposed on the drum, a clamping component movably disposed on the frame for clamping an end of the printing medium with the drum, and a resilient component disposed between the frame and the clamping component for pressing the clamping component on a surface of the drum to clamp the end of the printing medium. The convey mechanism is disposed on the base and located by a side of the supporter for conveying the printing medium to a position between the drum and the clamping component along a first direction.

According to the claimed invention, the printer further includes a constraining component disposed on the convey mechanism for keeping stable tension of the printing medium when the convey mechanism drives reversely.

According to the claimed invention, the printer further includes a thermal print head disposed on the base and located between the clamp mechanism and the convey mechanism for transferring dye on a ribbon to the printing medium.

The printer of the present invention utilizes the clamp mechanism to fix the front end of the printing medium (the paper), and rotates the drum to move a position of the clamp mechanism relative to the supporter. Because the clamp mechanism of the present invention clamps the front end of the printing medium in the printing procedures, the thorns of the clamping component do not form a series of pinholes on the printing medium along the conveying path. Therefore, an area of the printing medium whereon a pattern is formed is not damaged by the printer of the present invention, so the present invention not only can execute duplex printing by the same conveying path (the printing medium), but also can have preferable printing quality, so as to increase market competition of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
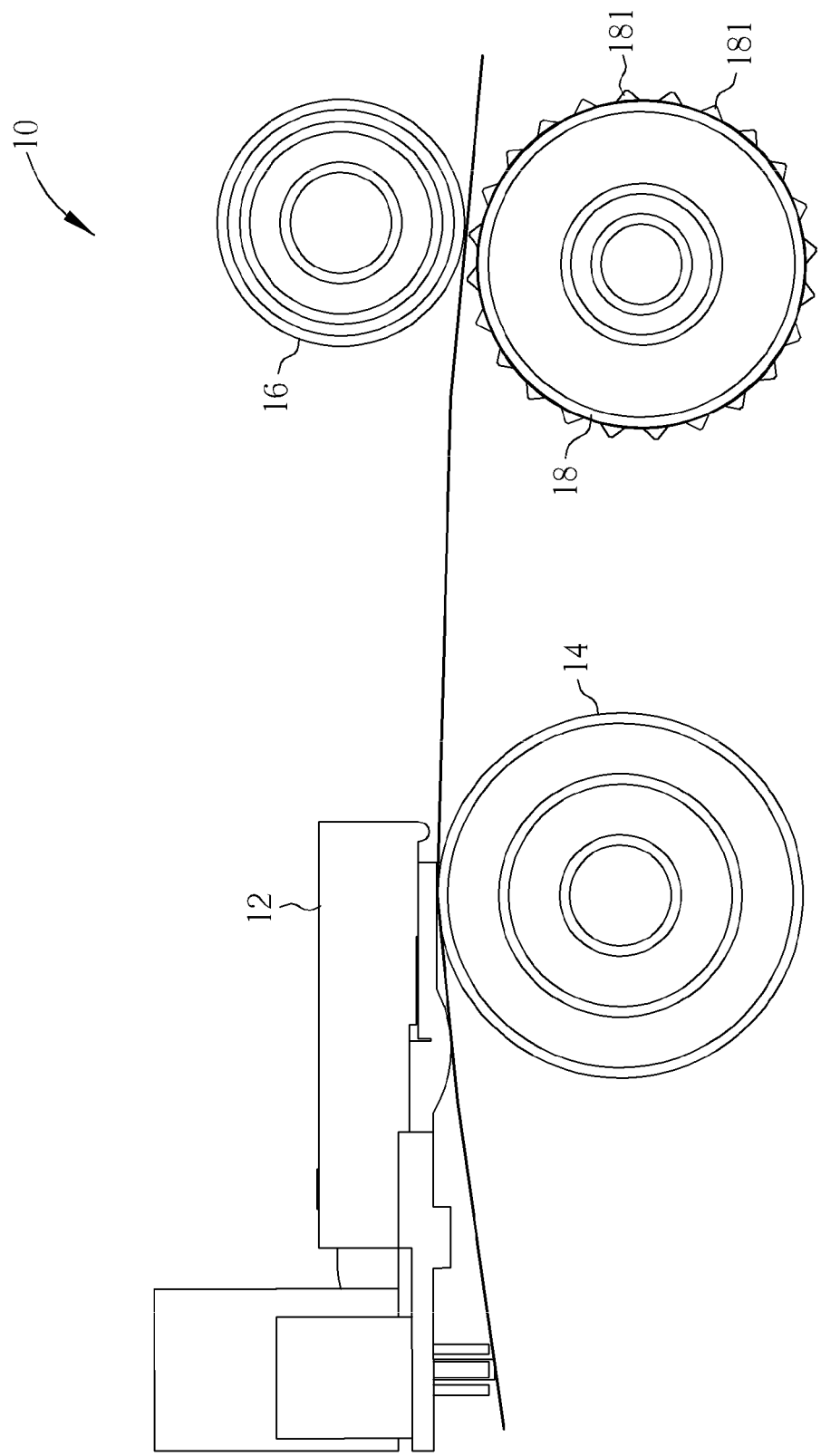
FIG. 1 is a diagram of a conveying mechanism in the prior art.
Figure 2:
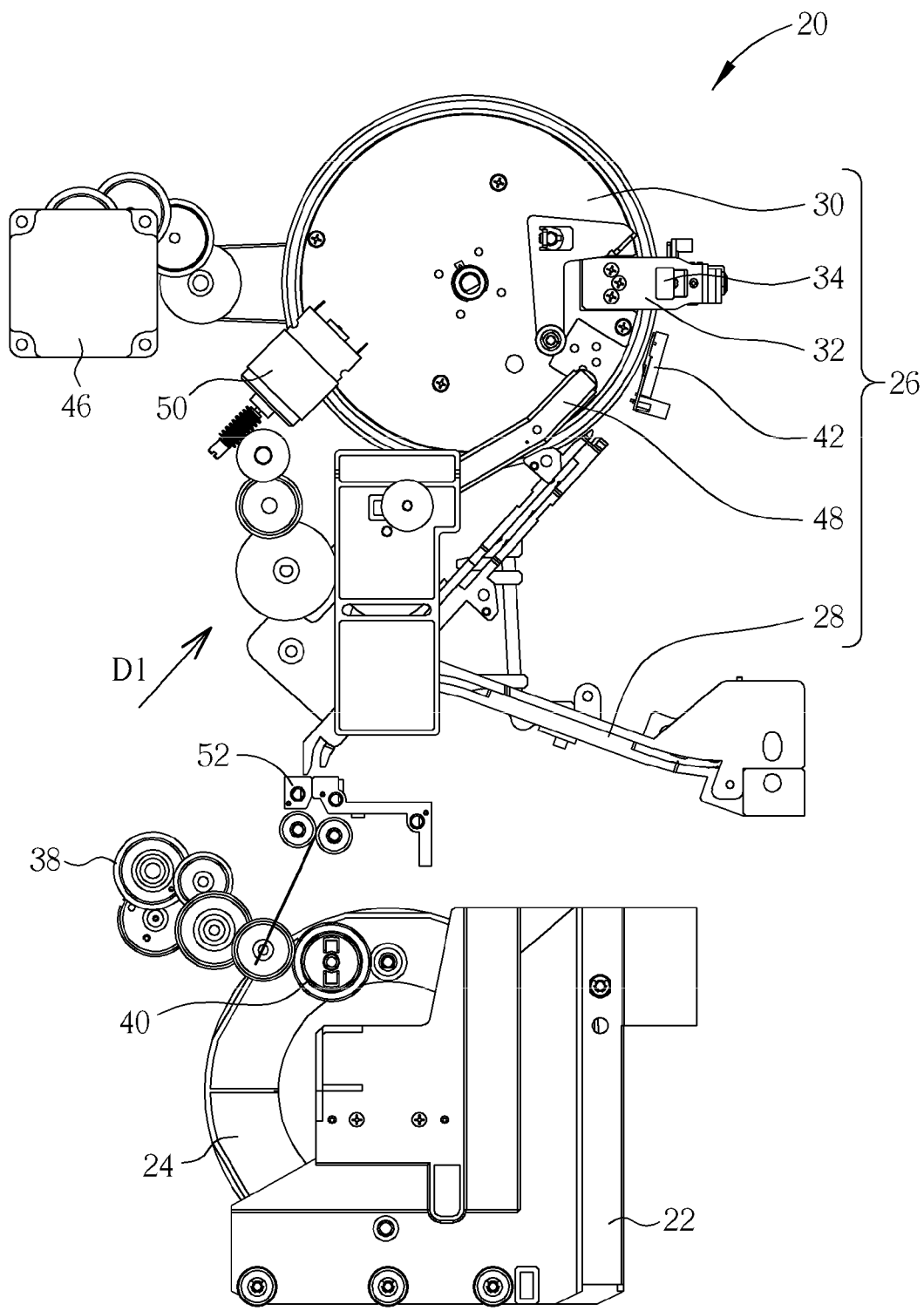
FIG. 2 is a diagram of a printer according to an embodiment of the present invention.
Figure 3:
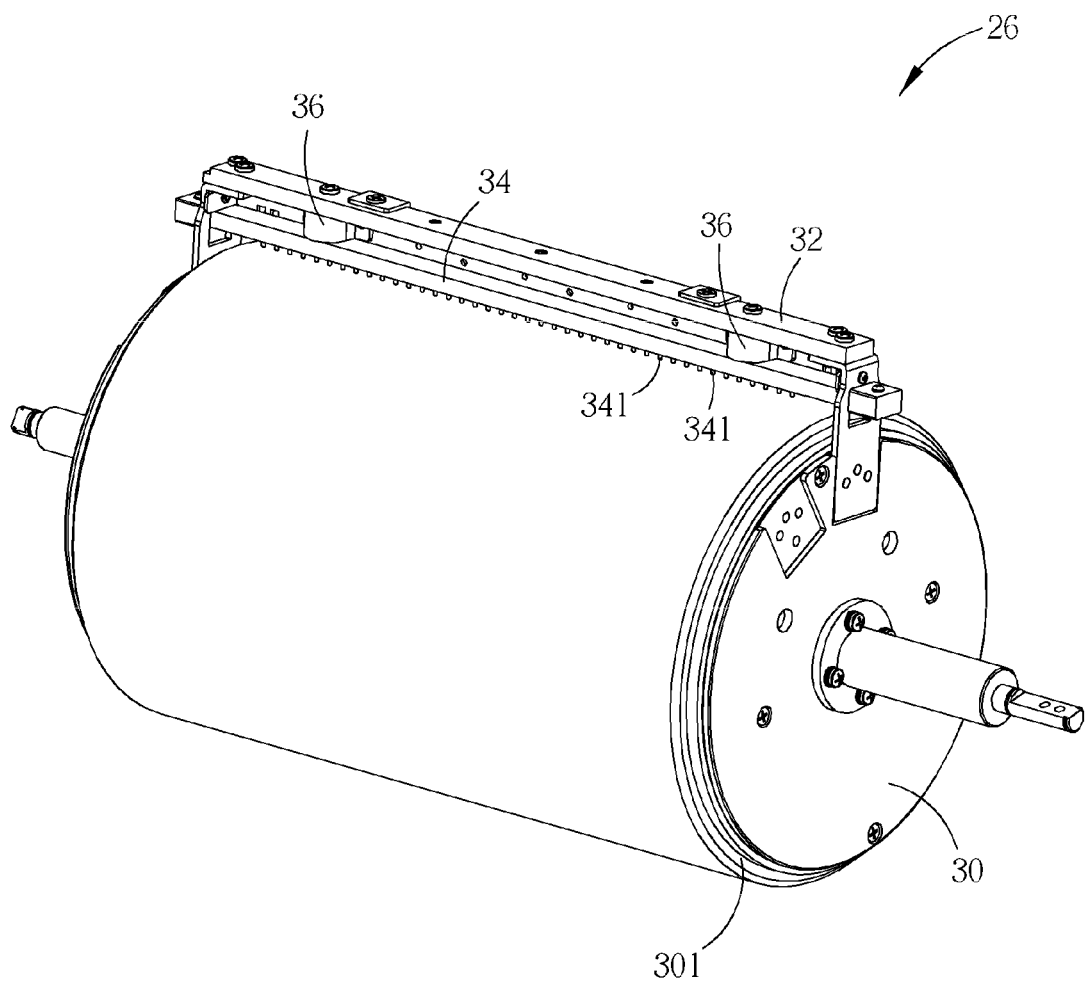
FIG. 3 is a diagram of a clamping mechanism at an open state according to the embodiment of the present invention.

Please refer to FIG. 2. FIG. 2 is a diagram of a printer 20 according to an embodiment of the present invention. The printer 20 includes a supporter 22 for supporting a printing medium 24, such as paper. The supporter 22 can be disposed on a bottom of a casing (not shown in the figure) of the printer 20. The printer 20 further includes a clamp mechanism 26 for stably clamping the printing medium 24 and increasing print quality. Please refer to FIG. 3. FIG. 3 is a diagram of the clamping mechanism 26 at an open state according to the embodiment of the present invention. The clamp mechanism 26 includes a base 28, a drum 30 pivotably disposed on the base 28, a frame 32 disposed on the drum 30, a clamping component 34 movably disposed on the frame 32, and two resilient components 36 respectively disposed between the frame 32 and the clamping component 34. The clamping component 34 shown in FIG. 3 does not contact the drum 30, so the printing medium 24 can move through a gap between the drum 30 and the clamping component 34, which shows the clamp mechanism 26 at the open state.

The printer 20 further includes a convey mechanism 38 disposed on the base 28 and located by a side of the supporter 22. The convey mechanism 38 can convey the printing medium 24 through the gap between the drum 30 and the clamping component 34 along a first direction D1, then the resilient components 36 can utilize resilient recovering force to press the printing medium 24 on a surface of the drum 30 by the clamping component 34, so that the printing medium 24 can be clamped tightly by the drum 30 and the clamping component 34 for preventing separation. For example, the convey mechanism 38 can include a conveying motor, a plurality of rolls and a plurality of gear sets. The conveying motor can dive the gear sets to rotate the rolls (such as a pinch roller, a platen roller, a capstan roller and so on), so as to convey the printing medium 24 stably.

As shown in FIG. 2 and FIG. 3, the printer 20 can further include a constraining component 40 disposed on the convey mechanism 38, and a thermal print head 42 disposed on the base 28 and located between the clamp mechanism 26 and the convey mechanism 38. When the convey mechanism 38 drives reversely, the printing medium 24 can be pulled at a direction opposite to the first direction D1, the printing medium 24 can keep stable tension by the constraining component 40, such as utilizing torque adjustment of the constraining component 40 to speed angular velocity of the rolls and the shaft of the convey mechanism 38, and the thermal print head 42 can transfer dye on a ribbon to the printing medium 24 stably for forming a pattern. In addition, a cushion 301 can be disposed on the surface of the drum 30, and the cushion 301 can be made of rubber material. A plurality of thorns 341 can be disposed on a surface of the clamping component 34 adjacent to the drum 30.

Generally, the clamping component 34 and the thorns 341 can be made of metal material. When the clamping component 34 clamps the printing medium 24 with the drum 24, the plurality of thorns 341 can puncture the printing medium 24 and insert into the cushion 301, so as to provide friction and constraint for preventing the printing medium 24 from separating from a clamp by the clamping component 34 and the drum 30. It should be mentioned that the clamp mechanism 26 can be fixed at an end of the printing medium 24, for example, the end of the printing medium 24 would be cut and thrown, and the printing medium 24 can move by rotation of the drum 30, so that the thermal print head 42 can transfer the dye on the ribbon to the printing medium 24.

Figure 4:
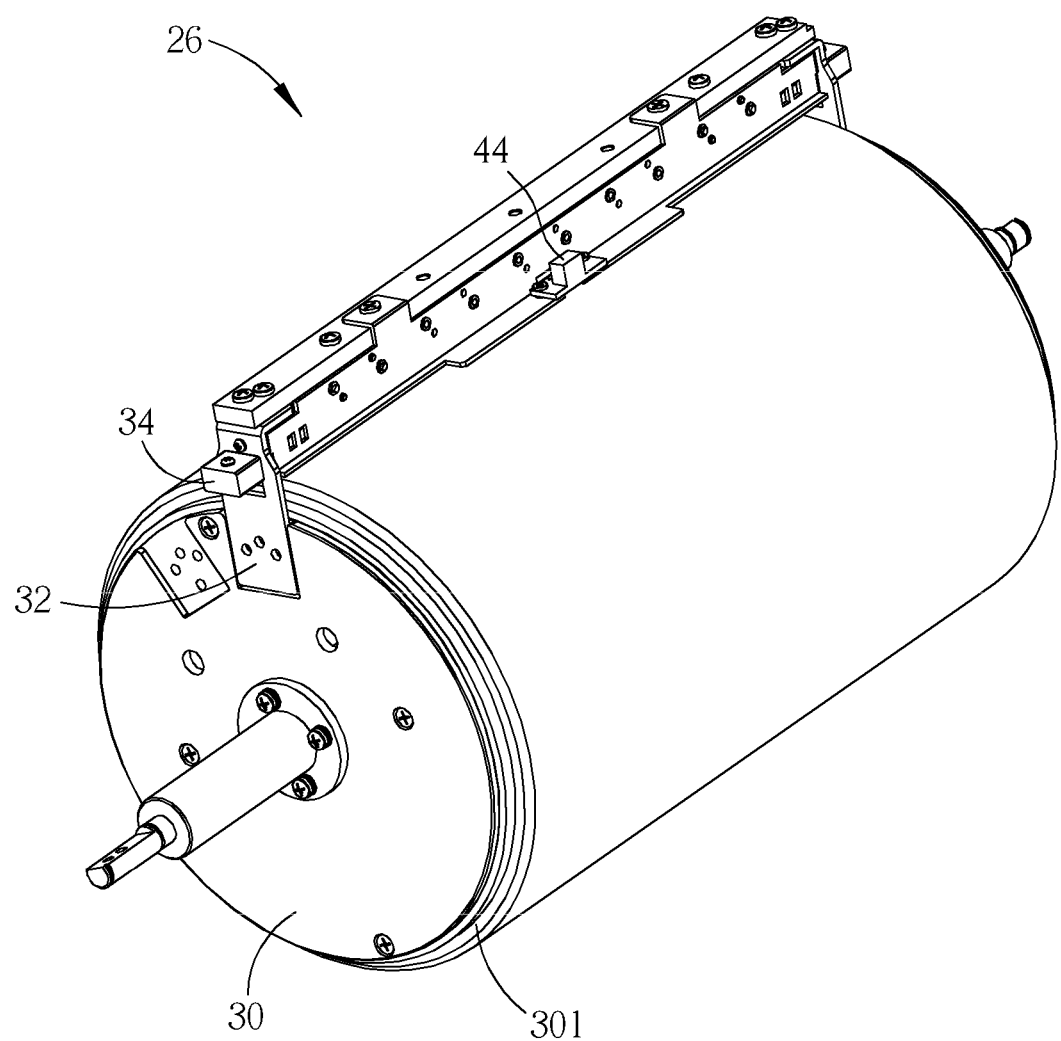
FIG. 4 is a diagram of the clamp mechanism in the other view according to the embodiment of the present invention.
Figure 5:
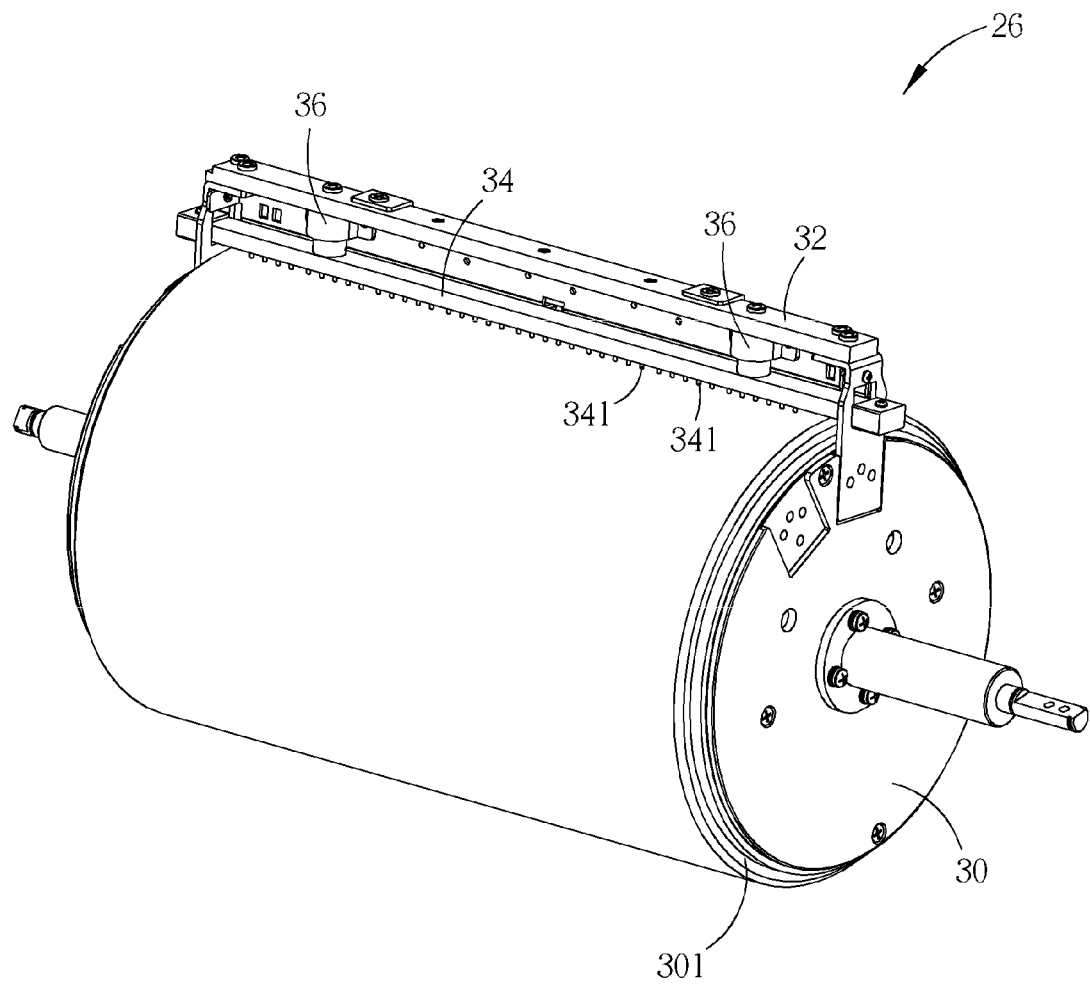
FIG. 5 is a diagram of the clamp mechanism at a clamp state according to the embodiment of the present invention.

Please refer to FIG. 4 and FIG. 5. FIG. 4 is a diagram of the clamp mechanism 26 in the other view according to the embodiment of the present invention. FIG. 5 is a diagram of the clamp mechanism 26 at a clamp state according to the embodiment of the present invention. The clamp mechanism 26 can further include a sensor 44 disposed on the frame 32. The sensor 44 can be an optical interrupter. When the printing medium 24 moves through the gap between the drum 30 and the clamping component 34, the sensor 44 can generate a control signal to drive the clamping component 34 to clamp the printing medium 24 with the drum 30, and the clamp mechanism 26 shown in FIG. 5 is at the clamp state. Furthermore, as shown in FIG. 2 to FIG. 4, the clamp mechanism 26 can further include a driving mechanism 46 disposed on the base 28 and connected to the drum 30, and a linkage 48 and a cam 50 respectively disposed on different positions of the base 28.

The driving mechanism 46 can include a driving motor, a plurality of rolls and gears. The driving mechanism 46 can rotate the drum 30 to move the clamping component 34 to an initial position or to an actuating position. The linkage 48 can separate the clamping component 34 from the surface of the drum 30 when the clamping component 34 moves to the initial position, as shown in FIG. 3 and FIG. 4, the printing medium 24 can move through the gap between the drum 30 and the clamping component 34. As the printing medium 24 has been accommodated inside the clamp mechanism 26, the cam 50 can separate the linkage 48 from the clamping component 34, and the clamping component 34 can press the surface of the drum 30 by the resilient recovering force of the resilient components 36, as shown in FIG. 5, so as to tightly clamp the printing medium 24 for preventing the separation. Meanwhile, the clamping component 34 can move from the initial position to the actuating position for printing procedures.

Figure 6:
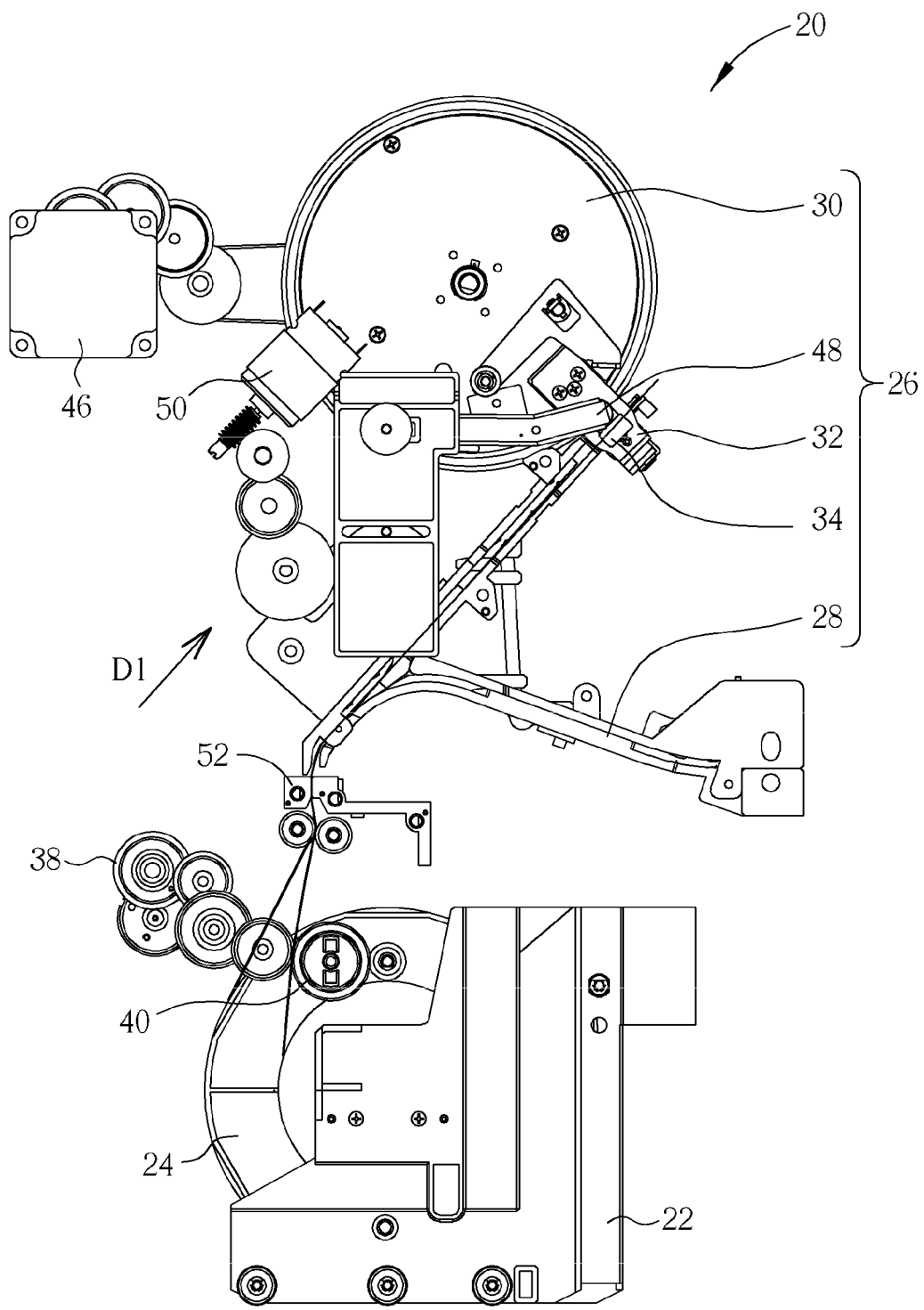
FIG. 6 is a diagram of the printer at the open state according to the embodiment of the present invention.
Figure 7:
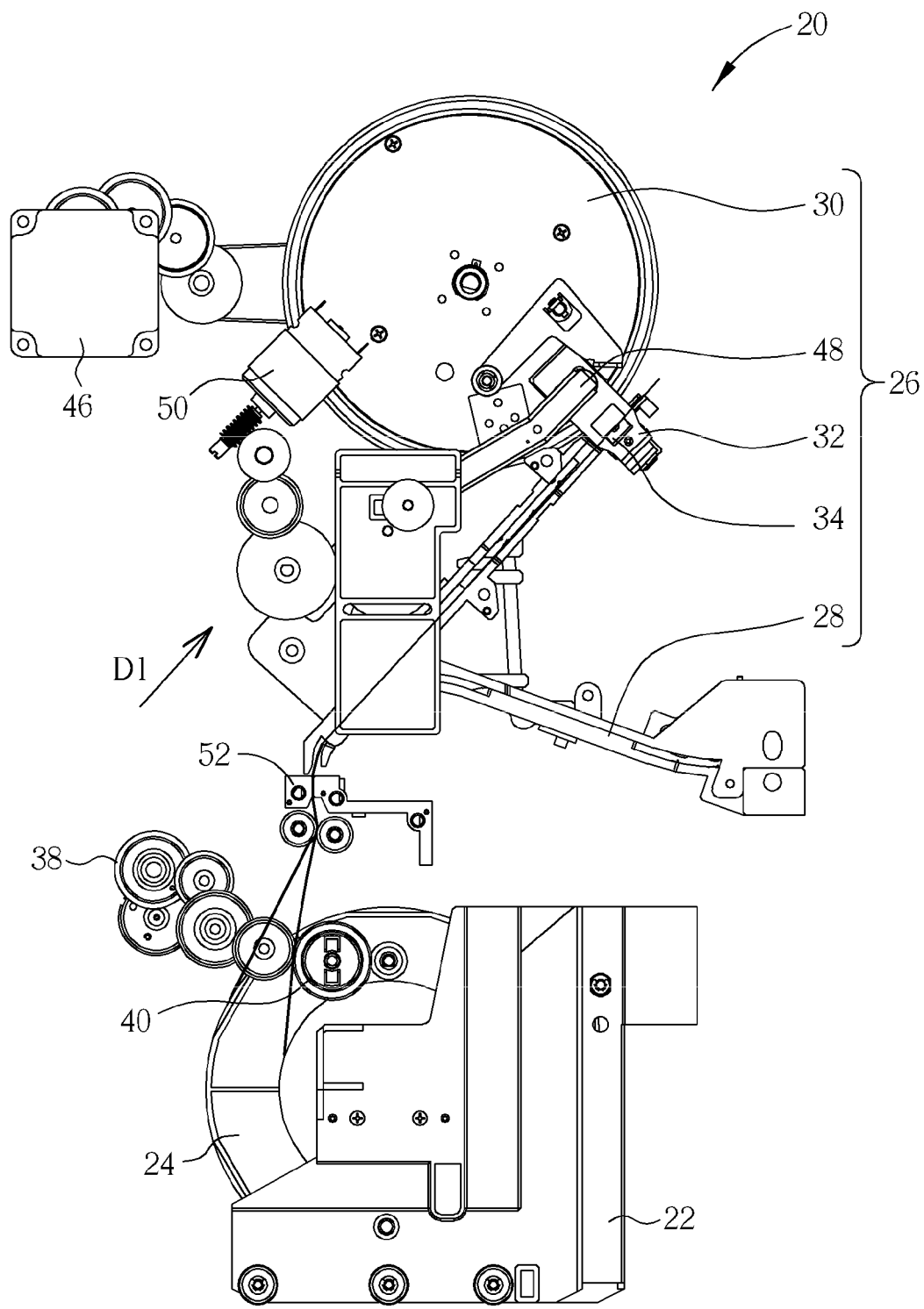
FIG. 7 is a diagram of the printer at the clamp state according to the embodiment of the present invention.

Please refer to FIG. 2, FIG. 6 and FIG. 7. FIG. 6 is a diagram of the printer 20 at the open state according to the embodiment of the present invention. FIG. 7 is a diagram of the printer 20 at the clamp state according to the embodiment of the present invention. FIG. 3 and FIG. 4 respectively are different views of the printer 20 shown in FIG. 6. FIG. 5 is the other view of the printer 20 shown in FIG. 7. As shown in FIG. 2, the clamp mechanism 26 of the printer 20 is at the actuating position. When the drum 30 rotates by the driving mechanism 46, the clamp mechanism 26 can move from the actuating position to the initial position shown in FIG. 6. The linkage 48 can separate the clamping component 34 from the surface of the drum 30, and the convey mechanism 38 can utilize a roller mechanism 52, which may be composed of the pinch roller and the capstan roller, to convey the printing medium 24 to the clamp mechanism 26.

As the sensor 44 senses that the printing medium 24 moves through the gap between the drum 30 and the clamping component 34, the sensor 44 can generate the control signal to drive the cam 50, to separate the linkage 48 from the clamping component 34, and the clamping component 34 presses the surface of the drum 30 by the resilient recovering force of the resilient components 35, as shown in FIG. 7. Thus, the printing medium 24 can be fixed between the cushion 301 of the drum 30 and the thorns 341 of the clamping component 34. The driving mechanism 46 can further rotate the drum 30 to move the clamp mechanism 26 of the printer 20 from the initial position shown in FIG. 7 to the actuating position shown in FIG. 2, and the constraining component 40 and the thermal print head 42 can be driven to execute the printing procedures.

Because the printing medium 24 is clamped when moving close to the clamping component 34, a front end of the printing medium 24 can be clamped by the clamp mechanism 26. As the front end of the printing medium 24 is fixed, the driving mechanism 46 can rotate the drum 30 to move the clamp mechanism 26 from the initial position to the actuating position. Therefore, damage area on the surface of the printing medium 24 by the thorns 341 of the clamping component 34 is among the front end of the printing medium 24. With a movement of the clamp mechanism 26, the clamp mechanism 26 can convey the printing medium 24 with the convey mechanism 38. At this time, the convey mechanism 38 can drive reversely to utilize the constraining component 40 to keep stable tension of the printing medium 24 with the clamp mechanism 26, so that the thermal print head 42 can execute high quality print operation. In conclusion, the clamp mechanism 26 of the printer 20 of the present invention can clamp the front end of the printing medium 24, to avoid that damage (such as needle points or pinholes) formed on the printing medium 24 along its conveying path.

Comparing to the prior art, the printer of the present invention utilizes the clamp mechanism to fix the front end of the printing medium (the paper), and rotates the drum to move a position of the clamp mechanism relative to the supporter. Because the clamp mechanism of the present invention clamps the front end of the printing medium in the printing procedures, the thorns of the clamping component do not form a series of pinholes on the printing medium along the conveying path. Therefore, an area of the printing medium whereon a pattern is formed is not damaged by the printer of the present invention, so the present invention not only can execute duplex printing by the same conveying path (the printing medium), but also can have preferable printing quality, so as to increase market competition of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clamp mechanism comprising:
   a base;
   a drum pivotably disposed on the base;
   a frame disposed on a lateral surface of the drum, an opening being formed on the frame;
   a clamping component movably disposed inside the opening of the frame along a longitudinal direction of the opening to be suspended over a support surface of the drum so as to switch between an open state or a clamp state, wherein a printing medium passes through a gap between the drum and the clamping component when the clamping component is switched to the open state, and the printing medium is clamped by the support surface of the drum and the clamping component when the clamping component is switched to the clamp state; and
   a resilient component disposed between the frame and the clamping component, the resilient component being adapted to move the clamping component relative to the frame along the longitudinal direction of the opening for pressing the clamping component on the support surface of the drum to clamp an end of the printing medium.

2. The clamp mechanism of claim 1, wherein a cushion is disposed on the support surface of the drum.

3. The clamp mechanism of claim 1, wherein a thorn is disposed on a surface of the clamping component adjacent to the drum, and the thorn punctures through the printing medium since opposite surfaces of the printing medium are respectively clamped by the drum and the clamping component.

4. The clamp mechanism of claim 1, further comprising:
   a sensor disposed on the frame for generating a control signal when the printing medium moves through the drum and the clamping component, so as to drive the clamping component to clamp the end of the printing medium with the drum.

5. The clamp mechanism of claim 4, wherein the sensor is an optical interrupter.

6. The clamp mechanism of claim 1, further comprising:
   a driving mechanism disposed on the base and connected to the drum for rotating the drum, so as to move the clamping component to an initial position and to an actuating position.

7. The clamp mechanism of claim 1, further comprising:
   a linkage disposed on the base for separating the clamping component from the support surface of the drum.

8. The clamp mechanism of claim 7, further comprising:
   a cam disposed on the base for separating the linkage from the clamping component.

9. A printer comprising:
   a supporter for supporting a printing medium;
   a clamp mechanism comprising:
      a base;
      a drum pivotably disposed on the base;
      a frame disposed on a lateral surface of the drum, an opening being formed on the frame;
      a clamping component movably disposed inside the opening of the frame along a longitudinal direction of the opening to be suspended over a support surface of the drum so as to switch between an open state or a clamp state, wherein a printing medium passes through a gap between the drum and the clamping component when the clamping component is switched to the open state, and the printing medium is clamped by the support surface of the drum and the clamping component when the clamping component is switched to the clamp state; and
      a resilient component disposed between the frame and the clamping component, the resilient component being adapted to move the clamping component relative to the frame along the longitudinal direction of the opening for pressing the clamping component on the support surface of the drum to clamp an end of the printing medium; and
   a convey mechanism disposed on the base and located by a side of the supporter for conveying the printing medium to a position between the drum and the clamping component along a first direction.

10. The printer of claim 9, further comprising:
    a constraining component disposed on the convey mechanism for keeping stable tension of the printing medium when the convey mechanism drives reversely.

11. The printer of claim 9, further comprising:
    a thermal print head disposed on the base and located between the clamp mechanism and the convey mechanism for transferring dye on a ribbon to the printing medium.

12. The printer of claim 9, wherein a cushion is disposed on the support surface of the drum.

13. The printer of claim 9, wherein a thorn is disposed on a surface of the clamping component adjacent to the drum, and the thorn punctures through the printing medium since opposite surfaces of the printing medium are respectively clamped by the drum and the clamping component.

14. The printer of claim 9, wherein the clamp mechanism further comprises:
    a sensor disposed on the frame for generating a control signal when the printing medium moves through the drum and the clamping component, so as to drive the clamping component to clamp the end of the printing medium with the drum.

15. The printer of claim 14, wherein the sensor is an optical interrupter.

16. The printer of claim 9, wherein the clamp mechanism further comprises:
 a driving mechanism disposed on the base and connected to the drum for rotating the drum, so as to move the clamping component to an initial position and to an actuating position.

17. The printer of claim 9, wherein the clamp mechanism further comprises:
 a linkage disposed on the base for separating the clamping component from the support surface of the drum.

18. The printer of claim 17, wherein the clamp mechanism further comprises:
 a cam disposed on the base for separating the linkage from the clamping component.

* * * * *